United States Patent
Rao et al.

(10) Patent No.: US 12,487,710 B2
(45) Date of Patent: Dec. 2, 2025

(54) DISPLAY PANEL AND PHOTOSENSITIVE DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Yang Rao, Shenzhen (CN); Leli Peng, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 102 days.

(21) Appl. No.: 17/298,653

(22) PCT Filed: Apr. 30, 2021

(86) PCT No.: PCT/CN2021/091452
§ 371 (c)(1),
(2) Date: May 31, 2023

(87) PCT Pub. No.: WO2022/222180
PCT Pub. Date: Oct. 27, 2022

(65) Prior Publication Data
US 2024/0012520 A1   Jan. 11, 2024

(30) Foreign Application Priority Data

Apr. 19, 2021   (CN) .......................... 202110417033.6

(51) Int. Cl.
*G06F 3/042*   (2006.01)
*G06F 3/041*   (2006.01)

(52) U.S. Cl.
CPC ............ *G06F 3/042* (2013.01); *G06F 3/0416* (2013.01)

(58) Field of Classification Search
CPC ...... G06F 3/042; G06F 3/0416; G06F 3/0386; G06F 3/0412; G06F 3/0421; G09F 9/301;
(Continued)

(56) References Cited

U.S. PATENT DOCUMENTS 5,117,100 A * 5/1992 Yoshida .................. G01V 8/20
250/221
8,188,968 B2   5/2012 Marks et al.
(Continued)

FOREIGN PATENT DOCUMENTS

CN   101825462 A   9/2010
CN   102279656 A   12/2011
(Continued)

OTHER PUBLICATIONS

Japanese Office Action issued in corresponding Japanese Patent Application No. 2021-525582 dated Jun. 27, 2023, pp. 1-4.
(Continued)

*Primary Examiner* — Temesghen Ghebretinsae
*Assistant Examiner* — Sosina Abebe
(74) *Attorney, Agent, or Firm* — PV IP PC; Wei Te Chung (57) ABSTRACT

The present application discloses a display panel and a photosensitive display device. The display panel includes a photosensitive array, an obtaining module, and a processing module. The photosensitive array includes photosensitive units arranged in an array. The obtaining module is connected to the photosensitive units. The processing module is connected to the obtaining module. A photosensing data of the photosensitive array can be obtained through the obtaining module. The processing module can determine a display (Continued)

coordinate of external light according to the photosensing data, thereby achieving a remote photosensitive interaction of the display panel.

14 Claims, 4 Drawing Sheets

(58) Field of Classification Search
CPC . G09F 9/33; G09G 5/003; G09G 5/10; G09G 2320/0233; G09G 2360/14; G09G 2360/16

See application file for complete search history.

(56) References Cited

U.S. PATENT DOCUMENTS

| | | |
|---|---|---|
| 2011/0221707 A1 | 9/2011 | Oyobe et al. |
| 2012/0275133 A1 | 11/2012 | Chang |
| 2015/0169173 A1 | 6/2015 | Chavez |
| 2016/0034038 A1* | 2/2016 | Duan ............... G06F 3/017 345/156 |
| 2017/0031527 A1 | 2/2017 | Dearn |

FOREIGN PATENT DOCUMENTS

| | | |
|---|---|---|
| CN | 103513914 A | 1/2014 |
| CN | 103729096 A | 4/2014 |
| CN | 105044952 A | 11/2015 |
| CN | 106707576 A | 5/2017 |
| CN | 107728976 A | 2/2018 |
| CN | 109710114 A | 5/2019 |
| CN | 110703957 A | 1/2020 |
| CN | 111179865 A | 5/2020 |
| JP | 2004318819 A | 11/2004 |
| JP | 2006244446 A | 9/2006 |
| JP | 2008102418 A | 5/2008 |
| JP | 2009070160 A | 4/2009 |
| JP | 2011100436 A | 5/2011 |
| KR | 20090097095 A | 9/2009 |
| KR | 20130017888 A | 2/2013 |

OTHER PUBLICATIONS

Korean Office Action issued in corresponding Korean Patent Application No. 10-2021-7017281 dated Aug. 3, 2022, pp. 1-18.
Chinese Office Action in corresponding Chinese Patent Application No. 202110417033.6 dated Dec. 31, 2021, pp. 1-7.
International Search Report in International application No. PCT/CN2021/091452, mailed on Dec. 14, 2021.
Written Opinion of the International Searching Authority in International application No. PCT/CN2021/091452, mailed on Dec. 14, 2021.
Extended European search report issued in corresponding European Patent Application No. 21737530.2 dated Feb. 5, 2025. p. 1-10.

* cited by examiner

| R/C | C1 | C2 | ...... | Cn |
|---|---|---|---|---|
| R1 | D11 | D12 | ...... | D1n |
| R2 | D21 | D22 | ...... | D2n |
| ...... | ...... | ...... | ...... | ...... |
| Rm | Dm1 | Dm2 | ...... | Dmn |

DISPLAY PANEL AND PHOTOSENSITIVE DISPLAY DEVICE

RELATED APPLICATIONS

This application is a Notional Phase of PCT Patent Application No. PCT/CN2021/091452 having international filing date of Apr. 30, 2021, which claims the benefit of priority of Chinese Patent Application No. 202110417033.6 filed on Apr. 19, 2021. The contents of the above applications are all incorporated by reference as if fully set forth herein in their entirety.

FIELD OF INVENTION

The present application is related to the field of display technology and specifically to a display panel and a photosensitive display device.

BACKGROUND OF INVENTION

With development of information technology, types of display technologies for displaying images have also increased. Application types of the display panels are also abundant, such as liquid crystal displays, plasma display panels, and organic light-emitting diode display devices.

However, these conventional display panels cannot remotely interact with displayed images according to external light, which means that photosensitive interaction technology cannot be implemented. The photosensitive interaction technology can integrate photosensitive sensors into the display panels and achieve precise remote interaction technology by using the external light as a control source.

It should be noted that the above introduction of background technology is only to facilitate a clear and complete understanding of technical solutions of the present application. Therefore, it cannot be considered that the technical solutions involved above are known to those skilled in the art just because it appears in the background of the present application.

SUMMARY OF INVENTION

The present application provides a display panel and a photosensitive display device to solve technical problems of a remote photosensitive interaction of the display panel.

In a first aspect, the display panel provided by the present application includes a photosensitive array, an obtaining module, and a processing module. The photosensitive array includes photosensitive units arranged in an array. The obtaining module is connected to the photosensitive units and is configured to obtain a photosensing data of the photosensitive array. The photosensing data includes a photosensing coordinate and a read data of at least one of the photosensitive units. The processing module is connected to the obtaining module and is configured to obtain an average photosensing coordinate of external light according to the photosensing coordinate and the read data of each of the photosensitive units to determine a display coordinate of the external light.

In an embodiment, the photosensing coordinate includes a photosensing abscissa and a photosensing ordinate. The average photosensing coordinate includes an average photosensing abscissa and an average photosensing ordinate. The processing module obtains the average photosensing abscissa of the external light according to the photosensing abscissa and the read data of each of the photosensitive units.

In an embodiment, the processing module obtains the average photosensing ordinate of the external light according to the photosensing ordinate and the read data of each of the photosensitive units.

In an embodiment, a total number of photosensing rows of the photosensitive units in the photosensitive array is m. A total number of photosensing columns of the photosensitive units in the photosensitive array is n. A total number of display rows of subpixels of the display panel is M. A total number of display columns of the subpixels of the display panel is N. The display coordinate includes a display abscissa and a display ordinate. The processing module determines the display abscissa of the external light according to the total number of the photosensing rows, the total number of the display rows, and the average photosensing abscissa.

In an embodiment, the processing module determines the display ordinate of the external light according to the total number of the photosensing columns, the total number of the display rows, and the average photosensing abscissa.

In an embodiment, the processing module obtains the average photosensing abscissa according to the following formula:

$$x_A = \frac{\sum_{i=1,j=1}^{i=n,j=m} C_i D_{ij}}{\sum_{i=1}^{n} C_i};$$

and $x_A$ represents the average photosensing abscissa, $C_i$ represents a current column number of one of the photosensitive units in the photosensitive array, and $D_{ij}$ represents the read data of one of the photosensitive units in a j-th row and an i-th column in the photosensitive array.

In an embodiment, the processing module obtains the average photosensing ordinate according to the following formula:

$$y_A = \frac{\sum_{i=1,j=1}^{i=n,j=m} R_j D_{ij}}{\sum_{i=1}^{n} R_j};$$

and $y_A$ represents the average photosensing ordinate, $R_j$ represents a current row number of one of the photosensitive units in the photosensitive array, and $D_{ij}$ represents the read data of one of the photosensitive units in the j-th row and the i-th column in the photosensitive array.

In an embodiment, the display abscissa is obtained according to the following formula:

$$X_A = M \times x_A \div m; \text{ and}$$

$X_A$ represents the display abscissa.

In an embodiment, the display ordinate is obtained according to the following formula:

$$Y_A = N \times x_A \div n; \text{ and}$$

$Y_A$ represents the display ordinate.

In a second aspect, the photosensitive display device provided by the present application includes the display panel in any of the above embodiments.

The display panel and the photosensitive display device provided by the present application can obtain the photosensing data of the photosensitive array through the obtaining module. The processing module can determine the display coordinate of the external light according to the photosensing data, thereby achieving the remote photosensitive interaction of the display panel.

DETAILED DESCRIPTION OF EMBODIMENTS

In order to make purposes, technical solutions, and effects of the present application clearer and more specific, the present application is further described in detail below with reference to the accompanying drawings and examples. It should be understood that the specific embodiments described herein are only used to explain the application, and are not used to limit the present application.

Figure 1:
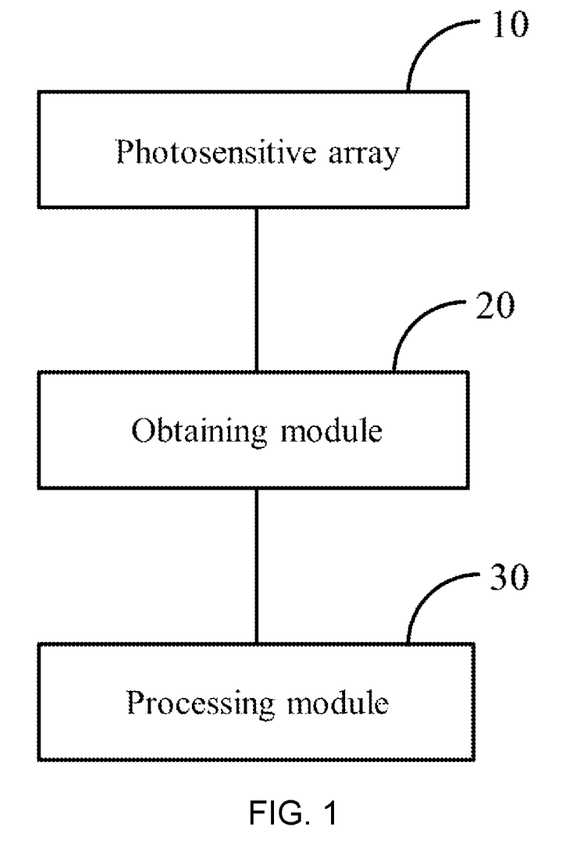
FIG. 1 is a structural schematic diagram of a display panel provided by an embodiment of the present application.

Please refer to FIGS. 1-5. As shown in FIG. 1, this embodiment provides a display panel, which includes a photosensitive array 10, an obtaining module 20, and a processing module 30. The photosensitive array 10 includes photosensitive units 11 arranged in an array. The obtaining module 20 is connected to the photosensitive units 11 and is configured to obtain a photosensing data of the photosensitive array 10. The processing module 30 is connected to the obtaining module 20 and is configured to determine a display coordinate of external light 600 according to the photosensing data.

It can be understood that the display panel provided by this embodiment can obtain the photosensing data of the photosensitive array 10 through the obtaining module 20. The processing module 30 can determine the display coordinate of the external light 600 according to the photosensing data, thereby achieving a remote photosensitive interaction of the display panel.

It should be explained that the obtaining module 20 can be, but is not limited to a photosensing data reading chip, and can also be a photosensing data reading integrated circuit, which can obtain the photosensing data of an entire frame.

The display panel can further include M rows and N columns of subpixels. The display coordinate can correspond to a number of the rows and a number of the columns of the subpixels. For example, the display coordinate can be expressed as (M, N).

It can be understood that the external light 600 can be, but is not limited to a laser light source emitted by a laser pointer or an infrared light source. When the external light 600 irradiates a corresponding photosensitive unit 11, the photosensitive unit 11 responds to a light signal and converts it into a corresponding electrical signal. The obtaining module 20 can obtain electrical signals in different photosensitive units 11 and a photosensing coordinate of the corresponding photosensitive unit 11 in the photosensitive array 10 in real-time. Then, the processing module 30 can obtain the display coordinate corresponding to the external light 600 according to the photosensing data in a display frame. This can provide an implementation basis for the display panel to perform the remote photosensitive interaction.

In an embodiment, the photosensing data obtained by the obtaining module 20 includes the photosensing coordinate and a read data of at least one of the photosensitive units 11. The processing module 30 obtains an average photosensing coordinate of the external light 600 according to the photosensing coordinate and the read data of each of the photosensitive units 11.

Figure 2:
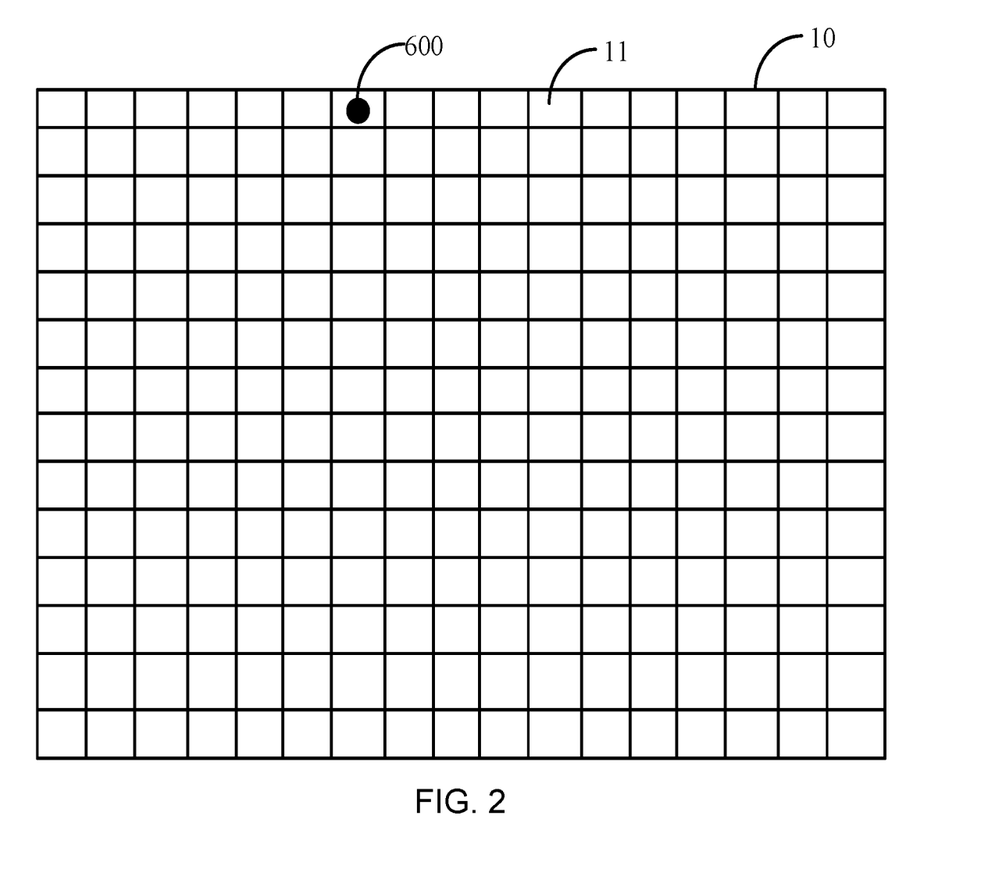
FIG. 2 is another structural schematic diagram of the display panel provided by an embodiment of the present application.

As shown in FIG. 2, it should be explained that the photosensitive array 10 can include m rows and n columns of the photosensitive units 11. The photosensing coordinate of the corresponding photosensitive unit 11 is a number of the rows and a number of the columns where the photosensitive unit 11 is located in the photosensitive array 10, and the photosensing coordinate can be (m, n). The read data can be the electrical signal stored in the corresponding one of the photosensitive units 11. For example, in a display frame, if the photosensitive unit 11 is not irradiated by the external light 600, the electrical signal stored in the photosensitive unit 11 is infinitely close to zero; and in a display frame, if the photosensitive unit 11 is irradiated by the external light 600, the electrical signal stored in the photosensitive unit 11 is greater than zero. Furthermore, as irradiation intensity and/or an irradiation time of the external light 600 increases, the electrical signal stored in the photosensitive unit 11 accordingly increases, and the read data correspondingly becomes greater. The obtaining module 20 can correspondingly obtain the photosensing coordinate of each of the photosensitive units 11 and the read data of the corresponding photosensitive unit 11. The processing module 30 can obtain the average photosensing coordinate corresponding to the external light 600 in a current frame according to the photosensing coordinate and the read data of each of the photosensitive units 11.

Figure 3:
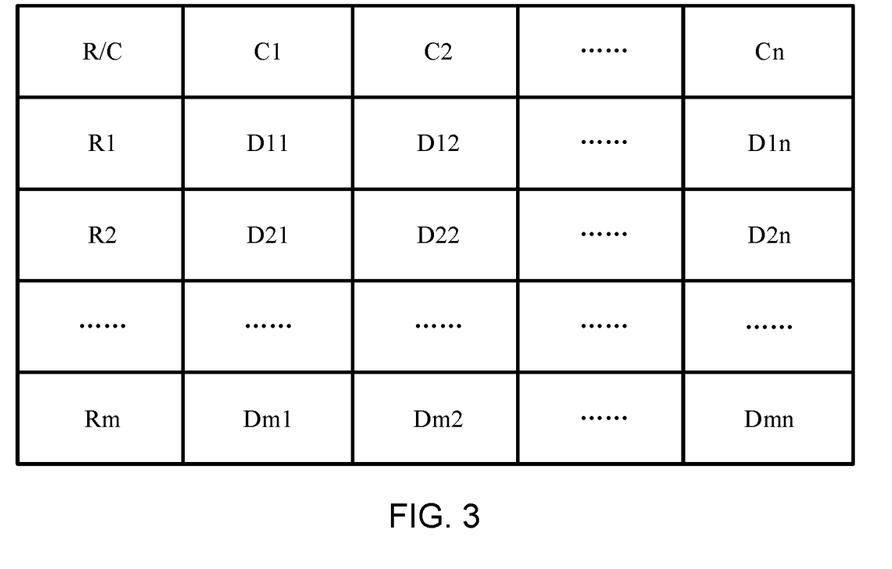
FIG. 3 is a structural schematic diagram of a photosensing data of a photosensitive array provided by an embodiment of the present application.

As shown in FIG. 3, there are the photosensing data of the photosensitive array 10 obtained by the obtaining module 20 in a display frame. R represents rows of the photosensitive array 10, and Rm represents a number of the rows of the photosensitive array 10. C represents columns of the photosensitive array 10, and Cn represents a number of the columns of the photosensitive array 10. Dmn represents the photosensing data of the photosensitive unit 11 in an m-th row and an n-th column in the photosensitive array 10. For example, the photosensing data of the photosensitive unit 11 in the first row R1 and the first column C1 can be D11, the photosensing data of the photosensitive unit 11 in the first row R1 and the second column C2 can be D12, and the photosensing data of the photosensitive unit 11 in the first row R1 and the n-th column Cn can be D1n. Also, the photosensing data of the photosensitive unit 11 in the second row R2 and the first column C1 can be D21, the photosensing data of the photosensitive unit 11 in the second row R2 and the second column C2 can be D22, and the photosensing data of the photosensitive unit 11 in the second row R2 and the n-th column Cn can be D2n. Furthermore, the photosensing data of the photosensitive unit 11 in the m-th row Rm and the first column C1 can be Dm1, the photosensing data of the photosensitive unit 11 in the m-th row Rm and the second column C2 can be Dm2, and the photosensing data of the photosensitive unit 11 in the m-th row Rm and the n-th column Cn can be Dmn.

In an embodiment, the photosensing coordinate includes a photosensing abscissa and a photosensing ordinate. The average photosensing coordinate includes an average photosensing abscissa and an average photosensing ordinate. The processing module 30 obtains the average photosensing abscissa of the external light 600 according to the photosensing ordinate and the read data of each of the photosensitive units 11.

Specifically, the processing module 30 can obtain the average photosensing abscissa according to the following formula:

$$x_A = \frac{\sum_{i=1,j=1}^{i=n,j=m} C_i D_{ij}}{\sum_{i=1}^{n} C_i}$$

$x_A$ represents the average photosensing abscissa, $C_i$ represents a current column number of the photosensitive unit 11 in the photosensitive array 10, and $D_{ij}$ represents the read data of the photosensitive unit 11 in a j-th row and an i-th column in the photosensitive array 10.

In an embodiment, the processing module 30 obtains the average photosensing ordinate of the external light 600 according to the photosensing abscissa and the read data of each of the photosensitive units 11.

Specifically, the processing module 30 obtains the average photosensing ordinate according to the following formula:

$$y_A = \frac{\sum_{i=1,j=1}^{i=n,j=m} R_j D_{ij}}{\sum_{i=1}^{n} R_j}$$

$y_A$ represents the average photosensing ordinate, $R_j$ represents a current row number of the photosensitive unit 11 in the photosensitive array 10, and $D_{ij}$ represents the read data of the photosensitive unit 11 in the j-th row and the i-th column in the photosensitive array 10.

In an embodiment, a total number of photosensing rows of the photosensitive units 11 in the photosensitive array 10 is m. A total number of photosensing columns of the photosensitive units 11 in the photosensitive array 10 is n. A total number of display rows of the subpixels of the display panel is M. A total number of display columns of the subpixels of the display panel is N. The display coordinate includes a display abscissa and a display ordinate. The processing module 30 determines the display abscissa of the external light 600 according to the total number of the photosensing rows, the total number of the display rows, and the average photosensing abscissa.

In an embodiment, the processing module 30 determines the display ordinate of the external light 600 according to the total number of the photosensing columns, the total number of the display rows, and the average photosensing abscissa.

Specifically, the display abscissa can be obtained according to the following formula:

$$X_A = M \times x_A \div m$$

$X_A$ represents the display abscissa. The display abscissa can be a corresponding number of the display rows. It should be explained that if the obtained display abscissa is a non-integer, the processing module 30 can further perform an integerization operation on the display abscissa. For example, the display abscissa is performed the integerization operation through a rounding method, or the display abscissa is performed the integerization operation through a ceiling method, and so on.

Specifically, the display ordinate is obtained according to the following formula:

$$Y_A = N \times x_A \div n$$

$Y_A$ represents the display ordinate. The display ordinate can be a corresponding number of the display columns. It should be explained that if the obtained display ordinate is a non-integer, the processing module 30 can further perform an integerization operation on the display abscissa. For example, the display abscissa is performed the integerization operation through a rounding method, or the display abscissa is performed the integerization operation through a ceiling method, and so on.

As a result, the display abscissa and the display ordinate expressed in an integer form can be obtained, so as to correspond the number of the display rows and the number of the display columns that are also expressed in the integer form.

Therefore, the processing module 30 can determine the display coordinate corresponding to a specific irradiation position of the external light 600 according to the display abscissa and the display ordinate. The display coordinate is a key step to achieve the remote photosensitive interaction of the display panel. Based on this, a remote light control, for example, controlling function buttons on a display screen or perform operations such as drawing on a display whiteboard, can be achieved through the external light 600.

Figure 4:
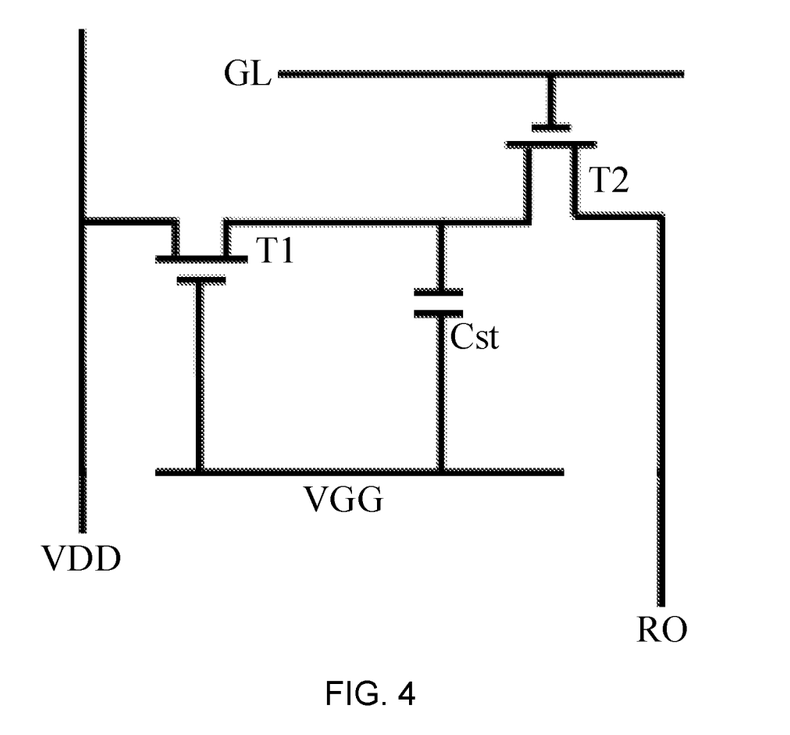
FIG. 4 is a structural schematic diagram of a photosensing unit provided by an embodiment of the present application.

As shown in FIG. 4, in an embodiment, the photosensitive unit can include a photosensitive thin-film transistor T1, a readout thin-film transistor T2, and a storage capacitor Cst. One of a source or a drain of the photosensitive thin-film transistor T1 is connected to a first power line VDD. The other one of the source or the drain of the photosensitive thin-film transistor T1 is connected to one end of the storage capacitor Cst and one of a source or a drain of the readout thin-film transistor T2. The other one of the source or the drain of the readout thin-film transistor T2 is connected to a readout signal line RO. A second power line VGG is connected to a gate of the photosensitive thin-film transistor T1 and the other end of the storage capacitor Cst. A scan signal line GL is connected to a gate of the readout thin-film transistor T2.

A signal voltage transmitted by the first power line VDD is higher than a signal voltage transmitted by the second power line VGG. The scan signal line GL can further be electrically connected to at least one subpixel row and is configured to control data signals to be written to the subpixels in the corresponding subpixel row. The readout signal line RO can be electrically connected to a readout chip.

The first power line VDD is parallel to the readout signal line RO. The second power line VGG is parallel to the scan signal line GL. The first power line VDD and the second power line VGG perpendicularly intersect and are not connected to each other. The readout signal line RO and the scan signal line GL perpendicularly intersect and are not connected to each other. It can be understood that the term "not connected to each other" can mean that there is no electrical connection between the two.

In an embodiment, the display panel in the above embodiment can be, but is not limited to an organic light-emitting diode (OLED) display, which is a display made of organic light-emitting diodes. Meanwhile, because OLED displays have self-luminous organic electroluminescent diodes, they do not need backlights. Also, because of excellent characteristics such as high contrast, thin thicknesses, wide viewing angles, fast response times, applicability to flexible panels, wide operating temperature ranges, and simple structure and manufacturing process, the OLED displays are considered to be next-generation flat-panel display emerging application technology.

The OLED displays become more and more common, and they are most prominent in products such as mobile phones, media players, and small entry-level televisions. Unlike standard liquid crystal displays, OLED pixels are driven by current sources.

The OLED displays are self-luminous display technology and do not require any backlight at all. Materials adopted in OLEDs are organic materials suitable for chemical structure. OLED technology requires a current control driving method. The OLEDs have electrical characteristics quite similar to standard light-emitting diodes (LEDs). A brightness of the LEDs depends on LED currents. In order to turn on and turn off the OLEDs and control OLED currents, thin-film transistor (TFT) control circuits are required.

Advanced energy-saving modes can achieve a highest efficiency. Like any battery-powered device, a longer battery standby time can only be achieved when converters operate at a highest efficiency of an overall load current range, which is especially important for the OLED displays. The OLED displays consume the most power when they are completely white, and their currents are relatively small for any other display colors. This is because only white requires all red, green, and blue subpixels to be fully bright. For example, a 2.7-inch display requires 80 mA of current to display a full-white image, but only 5 mA of current is required to display other icons or graphics. Therefore, an OLED power supply needs to achieve a high converter efficiency for all load currents. In order to achieve such efficiency, it is necessary to adopt advanced energy-saving mode technology to reduce the load currents to reduce a switching frequency of the converters. Because this is done through voltage-controlled oscillator (VCOs), it can minimize possible electromagnetic interference (EMI) problems and control a lowest switching frequency outside a general audio range of 40 kHz, which can prevent ceramic input or output capacitors from generating noise. This is particularly important when using this type of device in a mobile phone application and can simplify design processes.

In terms of luminous characteristics, white light does not consume the most power, but the power consumption is determined by the brightness value. For example, red, blue, and green lights with a brightness value of 10 produce white light with a brightness value of 30 when they are emitted together. However, adjusting the brightness value of each of the red, blue, and green light to 3.3 can synthesize the white light with a brightness value of 10 (theoretical value). For LEDs or OLEDs, when a human eye sees a same brightness, the blue light consumes the most power.

The OLED displays are composed of very thin coatings of organic materials and glass substrates. These organic materials emit light when an electric charge passes through them. Colors emitted by the OLED depend on materials of organic light-emitting layers, so manufacturers can change the materials of the light-emitting layers to obtain desired colors. Active-matrix organic light-emitting displays have built-in electronic circuit systems, so each pixel is independently driven by a corresponding circuit. The OLEDs have advantages such as simple structure, self-luminous without backlight, high contrast, thin thicknesses, wide viewing angles, fast response times, applicability to flexible panels, and wide operating temperature ranges.

Complexity and information density of car information systems are gradually increasing, which make internal displays of cars no longer just basic centralized instrument displays, but those that meet increasingly detailed and diverse in-car information displays needs. An automotive display market is divided into car navigation devices, car televisions, and car information systems by applications.

Display products required by car electronics have high requirements for environmental adaptability. Performance indicators of a universally demanded car display are: a brightness of 20-60 nit, a working lifespan at room temperature of 50,000 hours, and an endurance temperature range of −40-85° C. In a North American car display market, vacuum fluorescent displays (VFDs) have long been popular because they have an excellent brightness to ensure good visibility. But with rises of the OLED technology and liquid crystal display (LCD) technology, the VFDs gradually lose their advantages. Because the VFDs have high power consumption, full colors and resolutions are greatly restricted.

Compared with mature TFT-LCDs, the OLEDs are active luminous displays with high contrast, and have advantages such as wide viewing angles (up to 170°), fast response times (~1 μs), high luminous efficiency, low operating voltage (3-10V), and ultra-lightness and thinness (thickness less than 2 mm). Automotive displays made with the OLED technology can have thinner and more attractive appearances, better color display quality, wider viewing ranges, and a greater design flexibility. More importantly, an environmental adaptability of the OLEDs is far superior to that of the LCDs, and its tolerable temperature range reaches −40-85° C. Furthermore, the OLEDs do not contain lead, and do not cause pollution to environment. Therefore, the OLED display applications have great advantages in an automotive field.

Flexible screens refer to flexible OLEDs. Successful mass productions of the flexible screens are not only beneficial to a production of new generation high-end smartphones, but also have profound impacts on applications of wearable devices due to their low power consumption and flexibility. In the future, the flexible screens will be widely used with continuous development of personal intelligent terminals.

Flexible screen mobile phones refer to mobile phones with bendable and flexible screens.

The OLEDs are very thin and can be mounted on flexible materials such as plastic or metal foils. If plastic is adopted instead of glass, the displays become more durable and lighter. Flexible OLED panels are concave from top to bottom, with a bending radius of up to 700 mm.

The OLEDs adopt plastic substrate instead of common glass substrates. With a help of thin-film packaging technology and protective films pasted on backs of panels, the panels become bendable and not easy to break. The flexible screens can be rolled but not be folded. Future products should be foldable, and their appearances will be more variable.

The displays are cut from the panels. Bendable display screens, also known as the flexible screens, are regarded as products of an initial stage of display revolution. An ultimate goal is to transform mobile and wearable electronic devices.

A manufacturing method of the OLEDs is to produce organic functional layers and cathode layers by vacuum evaporation technology, which requires expensive evaporation equipment, so production costs are high, and a production efficiency is low. Meanwhile, limited by sizes of the vacuum evaporation equipment, a production of large-area display screens is difficult to achieve. Compared with the vacuum evaporation technology, a solution method has advantages of simple operation and low costs, and is suitable for low temperatures or room temperature conditions, especially for a production of large-size OLED screens. With rapid iteration of organic electronic technology, liquid phase processing technology of soluble organic materials has become increasingly mature. A liquid phase method, especially a printing process for the OLEDs, is considered to be one of key methods to solve a bottleneck of current OLED development.

The display panel in the above embodiment can further be a liquid crystal panel. The liquid crystal panel includes a polarizing film, a glass substrate, a black matrix, a color filter, a protective film, a common electrode, a calibration layer, a liquid crystal layer (liquid crystals, spacers, sealants), a capacitor, a display electrode, a prism layer, and a light scattering layer.

The polarizing film is also called polarizer. The polarizer is divided into an upper polarizer and a lower polarizer. Polarization functions of the upper polarizer and the lower polarizer are perpendicular to each other, acting like fences, which block light wave components according to requirements. For example, a light wave component perpendicular to the fences of the polarizer is blocked, and only a light wave component parallel to the fences is allowed to pass.

The glass substrate can be divided into an upper substrate and a lower substrate in the liquid crystal panel, and its main function is to clamp liquid crystal materials in a space between the two substrates. A material of the glass substrate generally adopts alkali-free borosilicate glass with excellent mechanical properties, heat resistance, and chemical corrosion resistance. For a TFT-LCD, one layer of the glass substrate is distributed with TFTs, and the other layer of the glass substrate is deposited with the color filter.

With a help of materials with high light-shielding properties, the black matrix is configured to separate three primary colors of red, green, and blue in the color filter (to prevent color confusion) and prevents a light leakage, which is conducive to enhancing a contrast of each color block. In addition, in the TFT-LCD, the black matrix can further cover an internal electrode traces or thin film transistors.

The color filter is also called color filter film, which is configured to generate the three primary colors of red, green, and blue to achieve a full-color display of the liquid crystal panel.

An alignment layer is also called alignment film or orientation layer, which is configured to allow liquid crystal molecules to achieve uniform alignment and orientation on a microscopic level.

A transparent electrode is divided into the common electrode and a pixel electrode. An input signal voltage is loaded between the pixel electrode and the common electrode. The transparent electrode is usually formed by depositing an indium tin oxide (ITO) material on the glass substrate to form a transparent conductive layer.

The liquid crystal materials act like a light valve in the liquid crystal panel, which can control a brightness of transmitted light, so as to achieve an information display effect.

A driving integrated circuit (IC) is actually a set of integrated circuit chip devices, which is configured to adjust and control phases, peak values, frequencies, etc. of an electric potential signal on the transparent electrode, establish a driving electric field, and finally realize an information display of the liquid crystal panel.

In the liquid crystal panel, the active-matrix organic light-emitting display is composed of a twisted nematic (TN) liquid crystal material enclosed between two glass substrates. An upper glass substrate close to the display is deposited with the red, green, and blue (RGB) color filter (or color filter film), the black matrix, and the common transparent electrode. A lower glass substrate (the substrate away from the display) is provided with thin-film transistor (TFT) devices, pixel transparent electrodes, storage capacitors, gate lines, signal lines, etc. The alignment films (alignment layers) are formed on inner sides of the two glass substrates to align the liquid crystal molecules. The liquid crystal material is injected between the two glass substrates, and spacers are spread to ensure a uniformity of a gap. Edges of the two glass substrates are bonded by frame sealing glue to achieve a sealing function, and the common electrodes of the upper and lower glass substrates are connected by a dispensing silver glue process.

The polarizers (polarizing films) are attached to outer sides of the upper and lower glass substrates. When a voltage is applied between the pixel transparent electrode and the common transparent electrode, an arrangement state of the liquid crystal molecules changes. Meanwhile, an intensity of incident light passing through the liquid crystal molecules also changes accordingly. The liquid crystal panel is directly based on an optical activity of the liquid crystal material, is coupled with a control of the electric field, to realize the information display.

LCD products are non-active light-emitting electronic devices, which do not have light-emitting characteristics and must rely on emissions of light sources in backlight modules to obtain a display performance. Therefore, a brightness of the LCDs is determined by their backlight modules. It can be seen that a performance of the backlight modules directly affects display qualities of the liquid crystal panels.

A backlight module includes an illuminating light source, a reflective plate, a light guide plate, a diffuser, a brightness enhancement film (prism film), and a frame. The backlight modules adopted in LCDs can be mainly divided into two categories: edge-lit backlight modules and direct-lit backlight modules. Mobile phones, laptop computers, and monitors (15 inches) mainly adopt the edge-lit backlight modules, while liquid crystal televisions mostly adopt the direct-type backlight modules as light sources. Backlight sources of the LCDs are mainly cold cathode fluorescent lamps (CCFLs) and light emitting diode (LED) light sources.

A reflector sheet is also called reflector, which is mainly to completely send light emitted by the light source into the light guide plate and reduces useless losses as much as possible.

A main function of the light guide plate is to guide light emitted by a edge light source to a front surface of the panel.

The prism film is also called brightness enhancement film, which is mainly to concentrate scattered lights at certain angles and then emit them from the backlight source through refraction and total reflection of the prism film to achieve a brighter display effect of the panel.

A main function of the diffuser is to correct edge light of the backlight module into a uniform surface light source to achieve an optical diffusion effect. The diffuser is divided into an upper diffuser and a lower diffuser. The upper diffuser is positioned between the prism film and a liquid crystal assembly, which is closer to the display panel. The lower diffuser is positioned between the light guide plate and the prism film, which is closer to the backlight source.

The LCD is a display that adopts liquid crystals as its material. The liquid crystals are an organic compound between solid and liquid. Under normal temperature conditions, the liquid crystals exhibit both liquid fluidity and optical anisotropy of crystals. The liquid crystals become a transparent liquid when heated and become a crystalline turbid solid after cooling.

Under an action of the electric field, an arrangement of the liquid crystal molecules change, which affects an intensity of an incident light beam through the liquid crystals. This change in light intensity is further manifested as a change in lightness and darkness through an action of the polarizer. Accordingly, through the control of the electric field of the liquid crystals, a brightness of light can be changed, so as to achieve a purpose of the information display. Therefore, a role of the liquid crystal material is similar to a small light valve.

Because there are control circuits and drive circuits around the liquid crystal material, when the electrodes in the LCD generate the electric field, the liquid crystal molecules will be twisted, so that light passing through them will be regularly refracted (e.g., the optical activity of the liquid crystal material). The light is filtered by a second layer of the polarizer and is displayed on the screen.

It is worth pointing out that because the liquid crystal material itself does not emit light, the LCD usually needs to be provided with an additional light source for the display panel. A main light source system is called backlight module. A backlight plate can be composed of a fluorescent material to emit light, and its function is mainly to provide a uniform backlight source.

Figure 5:
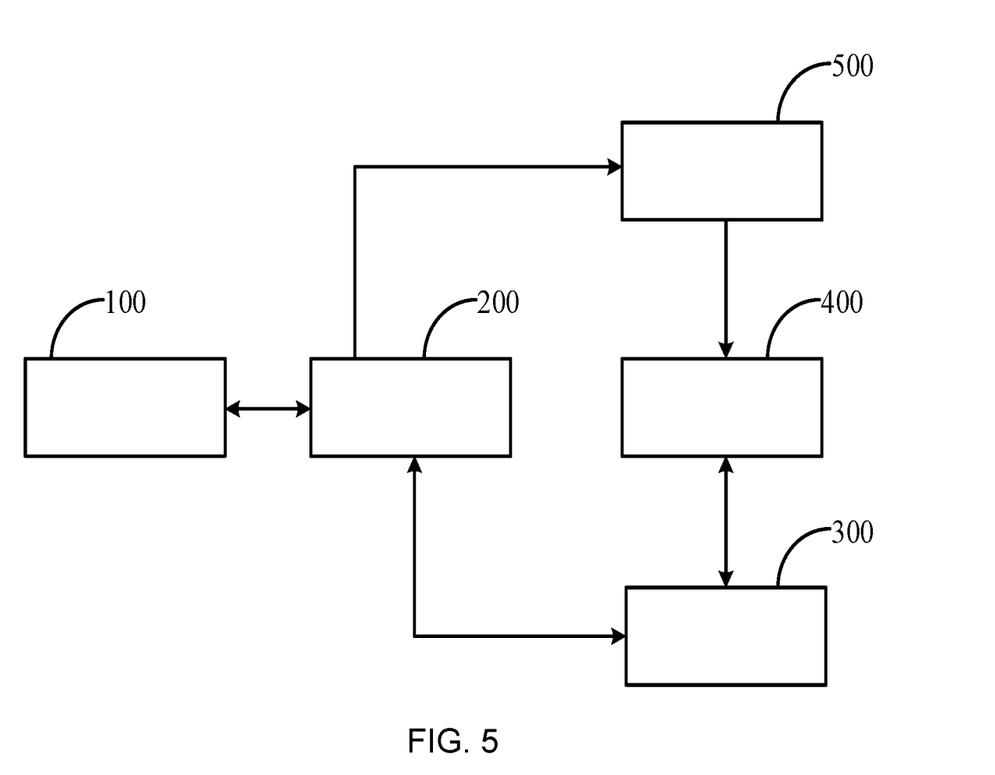
FIG. 5 is a structural schematic diagram of a photosensitive display device provided by an embodiment of the present application.

In an embodiment, this embodiment provides a photosensitive display device including the display panel 400 in any of the above embodiments.

It can be understood that the photosensitive display device provided by this embodiment can obtain the photosensing data of the photosensitive array through the obtaining module. The processing module can determine the display coordinate of the external light according to the photosensing data, thereby achieving the remote photosensitive interaction of the display panel 400.

As shown in FIG. 5, the photosensitive display device can also include a system-on-chip (SOC) 100, a field programmable gate array (FPGA) 200, a printed circuit board for display 500, and a printed circuit board for photosensing 300. The system-on-chip 100 is electrically connected to the field programmable gate array 200. The field programmable gate array 200 is electrically connected to the printed circuit board for display 500 and the printed circuit board for photosensing 300.

The system-on-chip 100 is also called system-scale chip, which means a product having an integrated circuit with a dedicated target, which contains a complete system and all contents of an embedded software. In this embodiment, the system-on-chip 100 can be configured to receive and process an image data input from an external video source and then output a corresponding video signal. Meanwhile, the system-on-chip 100 can also participate in a calculation process of the display coordinate of the external light.

The field programmable gate array 200 can be configured as a semi-custom circuit in a field of application specific integrated circuits, which can not only solve deficiencies of custom circuits, but also overcome shortcomings of fewer gate circuits in an original programmable device. The FPGA is a kind of the semi-custom circuit in the application specific integrated circuits and is a programmable logic array, which can effectively solve a problem of fewer gate circuits in an original device. A basic structure of FPGA includes programmable input and output units, a configurable logic block, a digital clock management module, an embedded block of random-access memory (RAM), wiring resources, an embedded dedicated hard core, and an underlying embedded functional unit. Because the FPGA has characteristics of abundant wiring resources, repeatable programming, high integration, and low investments, it has been widely used in a field of a digital circuit design. An FPGA design process includes an algorithm design, a code simulation and design, and board debugging. Designers and actual requirements establish an algorithm architecture, establish design solutions through an electronic design automation (EDA), and ensure that the design solutions meet the actual requirements through the code simulation. Finally, a board-level debugging is performed, and relevant files are downloaded to the FPGA through a configuration circuit to verify an actual operation effect.

With advancement of technology levels, video segmentation technology has gradually matured to meet people's basic requirements for clear video images. A hardware structure of an FPGA chip is quite special. Its internal structure can be adjusted through pre-edited logical structure files, and connections and positions of different logical units can be adjusted through constrained files to properly handle data line paths. A flexibility and an adaptability of the FPGA chip facilitate users' development and application. When processing video signals, the FPGA chip can fully utilize its own speed and structural advantages to implement ping-pong technology and pipeline technology. In a process of an external connection, the FPGA chip adopts a data parallel connection method to broaden a bit width of image information and increase an image processing speed through internal logic functions. The FPGA chip controls image processing and other devices through a cache structure and a clock management. In an overall design structure, the FPGA chip is at a core position, is configured for interpolation processing, extraction, and storage of a complex data, and further plays a role of overall control to ensure a stable operation of a system. In addition, video information processing is different from other data processing, which requires a chip with a special logic unit and a RAM or first-in first-out (FIFO) unit to ensure sufficient data transmission speed.

Based on this, in this embodiment, the field programmable gate array 200 can not only perform preset processing on the video signal, but also perform preset processing on the photosensing data. It can be understood that in display technology, both the video data and the photosensing data can be processed according to the embodiments described in the present application. If there are any details not described, they will be processed by well-known techniques, which are not repeatedly described herein.

It should be explained that the printed circuit board for display 500 can include a timing controller. The timing controller can control corresponding gate driver and data driver to achieve a normal display of the display panel 400.

The printed circuit board for photosensing 300 can include the obtaining module such as the readout chip. The readout chip is configured to read the photosensing data of the photosensitive array and parallelly performs corresponding processing or processing required in the above embodiment.

It can be understood that those having ordinary skills of the art may easily contemplate various changes and modifications of the technical solution and technical ideas of the present invention and all these changes and modifications are considered within the protection scope of right for the present invention.

What is claimed is:

1. A display panel, comprising:
   a photosensitive array comprising photosensitive units arranged in an array;
   an obtaining module connected to the photosensitive units and configured to obtain a photosensing data of the photosensitive array, wherein the photosensing data comprises a photosensing coordinate and a read data of at least one of the photosensitive units; and
   a processing module connected to the obtaining module and configured to obtain an average photosensing coordinate of external light according to the photosensing coordinate and the read data of each of the photosensitive units to determine a display coordinate of the external light;
   wherein the photosensing coordinate comprises a photosensing abscissa and a photosensing ordinate, and the average photosensing coordinate comprises an average photosensing abscissa and an average photosensing ordinate; and
   the processing module is configured to obtain the average photosensing abscissa of the external light according to the photosensing abscissa and the read data of each of the photosensitive units;
   wherein the display coordinate comprises a display abscissa of the external light; and
   the processing module is configured to determine the display abscissa of the external light according to a total number of photosensing rows of the photosensitive units in the photosensitive array, a total number of display rows of subpixels of the display panel, and the average photosensing abscissa.

2. The display panel according to claim 1, wherein the processing module obtains the average photosensing ordinate of the external light according to the photosensing ordinate and the read data of each of the photosensitive units.

3. The display panel according to claim 2, wherein the display coordinate further comprises a display ordinate of the external light; and
   the processing module determines the display ordinate of the external light according to a total number of photosensing columns of the photosensitive units in the photosensitive array, a total number of display columns of the subpixels of the display panel, and the average photosensing ordinate.

4. The display panel according to claim 3, wherein the processing module obtains the average photosensing abscissa according to the following formula:

$$x_A = \frac{\sum_{i=1,j=1}^{i=n,j=m} C_i D_{ij}}{\sum_{i=1}^{n} C_i};$$

and
   $x_A$ represents the average photosensing abscissa, $C_i$ represents a current column number of one of the photosensitive units in the photosensitive array, and $D_{ij}$ represents the read data of one of the photosensitive units in a j-th row and an i-th column in the photosensitive array; m represents the total number of photosensing rows of the photosensitive units in the photosensitive array, and n represents the total number of photosensing columns of the photosensitive units in the photosensitive array.

5. The display panel according to claim 4, wherein the processing module obtains the average photosensing ordinate according to the following formula:

$$y_A = \frac{\sum_{i=1,j=1}^{i=n,j=m} R_j D_{ij}}{\sum_{i=1}^{n} R_j};$$

; and
   $y_A$ represents the average photosensing ordinate, $R_j$ represents a current row number of one of the photosensitive units in the photosensitive array, and $D_{ij}$ represents the read data of one of the photosensitive units in the j-th row and the i-th column in the photosensitive array.

6. The display panel according to claim 5, wherein the display abscissa is obtained according to the following formula:

$$X_A = M \times x_A \div m;\ \text{and}$$

$X_A$ represents the display abscissa, and M represents the total number of display rows of the subpixels of the display panel.

7. The display panel according to claim 6, wherein the display ordinate is obtained according to the following formula:

$$Y_A = N \times y_A \div n;\ \text{and}$$

$Y_A$ represents the display ordinate, and N represents the total number of display columns of the subpixels of the display panel.

8. A photosensitive display device comprising a display panel, wherein the display panel comprises:
   a photosensitive array comprising photosensitive units arranged in an array;
   an obtaining module connected to the photosensitive units and configured to obtain a photosensing data of the photosensitive array, wherein the photosensing data comprises a photosensing coordinate and a read data of at least one of the photosensitive units; and
   a processing module connected to the obtaining module and configured to obtain an average photosensing coordinate of external light according to the photosensing coordinate and the read data of each of the photosensitive units to determine a display coordinate of the external light;
   wherein the photosensing coordinate comprises a photosensing abscissa and a photosensing ordinate, and the average photosensing coordinate comprises an average photosensing abscissa and an average photosensing ordinate; and
   the processing module is configured to obtain the average photosensing abscissa of the external light according to the photosensing abscissa and the read data of each of the photosensitive units;
   wherein the display coordinate comprises a display abscissa of the external light; and
   the processing module is configured to determine the display abscissa of the external light according to a total number of photosensing rows of the photosensitive units in the photosensitive array, a total number of display rows of subpixels of the display panel, and the average photosensing abscissa.

9. The photosensitive display device according to claim 8, wherein the processing module obtains the average photosensing ordinate of the external light according to the photosensing ordinate and the read data of each of the photosensitive units.

10. The photosensitive display device according to claim 9, wherein the display coordinate further comprises a display ordinate of the external light; and the processing module determines the display ordinate of the external light according to a total number of photosensing columns of the photosensitive units in the photosensitive array, a total number of display columns of the subpixels of the display panel, and the average photosensing ordinate.

11. The photosensitive display device according to claim 10, wherein the processing module obtains the average photosensing abscissa according to the following formula:

$$x_A = \frac{\sum_{i=1,j=1}^{i=n,j=m} C_i D_{ij}}{\sum_{i=1}^{n} C_i};$$

and $x_A$ represents the average photosensing abscissa, $C_i$ represents a current column number of one of the photosensitive units in the photosensitive array, and $D_{ij}$ represents the read data of one of the photosensitive units in a j-th row and an i-th column in the photosensitive array; m represents the total number of photosensing rows of the photosensitive units in the photosensitive array, and n represents the total number of photosensing columns of the photosensitive units in the photosensitive array.

12. The photosensitive display device according to claim 11, wherein the processing module obtains the average photosensing ordinate according to the following formula:

$$y_A = \frac{\sum_{i=1,j=1}^{i=n,j=m} R_j D_{ij}}{\sum_{i=1}^{n} R_j};$$

and $y_A$ represents the average photosensing ordinate, $R_j$ represents a current row number of one of the photosensitive units in the photosensitive array, and $D_{ij}$ represents the read data of one of the photosensitive units in the j-th row and the i-th column in the photosensitive array.

13. The photosensitive display device according to claim 12, wherein the display abscissa is obtained according to the following formula:

$X_A = M \times x_A \div m;$ and $X_A$ represents the display abscissa, and M represents the total number of display rows of the subpixels of the display panel.

14. The photosensitive display device according to claim 13, wherein the display ordinate is obtained according to the following formula:

$Y_A = N \times y_A \div n;$ and $Y_A$ represents the display ordinate, and N represents the total number of display columns of the subpixels of the display panel.

* * * * *